(12) United States Patent
Ma

(10) Patent No.: US 7,853,288 B2
(45) Date of Patent: Dec. 14, 2010

(54) SUNLIGHT ILLUMINATED AND SUNLIGHT READABLE MOBILE PHONE

(75) Inventor: Yao-Dong Ma, Frisco, TX (US)

(73) Assignee: MacroDisplay, Inc.

( * ) Notice: Subject to any disclaimer, the term of this patent is extended or adjusted under 35 U.S.C. 154(b) by 673 days.

(21) Appl. No.: 11/897,465

(22) Filed: Aug. 30, 2007

(65) Prior Publication Data
US 2009/0061945 A1 Mar. 5, 2009

(51) Int. Cl.
H04M 1/00 (2006.01)
(52) U.S. Cl. .............. 455/550.1; 455/566; 455/556.2; 345/102; 359/604
(58) Field of Classification Search ............. 455/550.1, 455/566, 556.2; 345/102; 359/604
See application file for complete search history.

(56) References Cited

U.S. PATENT DOCUMENTS

| | | | |
|---|---|---|---|
| 7,427,140 B1* | 9/2008 | Ma ............................. 359/604 |
| 2001/0013077 A1* | 8/2001 | Kim ............................ 710/101 |
| 2005/0014995 A1* | 1/2005 | Amundson et al. .......... 600/105 |
| 2005/0168134 A1* | 8/2005 | Nishikawa ................... 313/500 |
| 2006/0263672 A1* | 11/2006 | Lee et al. ....................... 429/39 |
| 2006/0274546 A1* | 12/2006 | Yamamura ................... 362/517 |
| 2007/0054710 A1* | 3/2007 | Pan ........................... 455/575.3 |
| 2007/0057901 A1* | 3/2007 | Chino ......................... 345/102 |

* cited by examiner

*Primary Examiner*—Danh C Le

(57) ABSTRACT

The present invention relates to a mobile phone device, more specifically, to a sunlight illuminated and sunlight readable mobile phone device. The display panel opens a transparent window to the ambient light, which allows the sunlight to illuminate the display in both indoor and outdoor applications. A light collecting panel is introduced to reflect or transform the external light with a suitable angle relative to the display panel. A mobile phone with sufficient high contrast ratio, superior readability and ultra wide color gamut has been achieved. The solar light can be utilized as the lighting source in both indoor and outdoor display modes, thus remarkably reduces the power consumption and substantially prolongs the operation time of the rechargeable battery.

18 Claims, 2 Drawing Sheets

SUNLIGHT ILLUMINATED AND SUNLIGHT READABLE MOBILE PHONE

BACKGROUND OF THE INVENTION

The global adoption of mobile phones has prompted development of small, high-resolution color displays to handle the increasingly stringent audiovisual needs of these devices.

Despite shrinking to less than the size of a deck of playing cards, mobile phones have become fully functioned devices that are not only able to make and receive calls but also are considered e-mail, calculator, schedule manager and alarm clock to be their basic functions. Furthermore, these phones can do digital still photography and provide photo transfer, gaming, storage, music playback, web browsing and mobile TV.

High-resolution color displays are helping phone makers incorporate more visual functions into the mobile handset since the quality of the image plays a major role in determining the perceived quality of the overall device.

Liquid crystal displays for mobile phones continue to improve. New LCD cell structures can increase image contrast, which can make dramatic improvements in the quality of color images. In order to reproduce crisp moving images, LCD panels with faster response time are being developed by using material improvements and new controlling software. As a result, displays will continue to improve so as to meet the increasing consumer demands for bright, detailed colorful images and high-content information from their mobile phones. Simpler phones can get by with a transflective LCD, which is adequate for simple indoor and outdoor functions. But audiovisual content is driving the movement toward transmissive displays with superior image quality for still and moving images. These displays deliver higher brightness and higher indoor contrast along with more-vivid colors and wider viewing angles.

Today, 2.2 inch diagonal displays are standard for mobile phones, either in QCIF (176×220) or QVGA (240×320). The trend is toward larger screens with 2.4 inch diagonal size and VGA to create more-detailed images. It is unlikely that the displays for the mobile phones will get any larger than this, at least for the near future, since a lager display will make the phone too big to be convenient. It is also unlikely that the resolutions of the displays higher than VGA will be required. A 2.4 inch VGA screen has 333 pixels per inch, which is more than three times as many as a typical SXGA desktop PC monitor.

One problem with the increased resolution is that the LCD cell aperture ratio is decreased, so a brighter backlight is needed to achieve the same image brightness as that of a lower resolution panel. For example, a 2.2-inch QCIF+ panel has a 60 percent aperture ratio, compared with only 10 percent for a 2.4 inch VGA panel.

While consumers demand lager, higher-resolution displays on their phones with brighter images, they also want their phones to be thinner and lighter. This means not only the displays must be thin (a typical 2.2-inch QVGA panels is only 2.6 mm think, including the backlight) but also the supporting circuitry must be small. The typical large-scale-integration driver chips are 2 mm thick, but new designs have halved that dimension.

Power consumption is another important issue for display design. Brighter backlights and more functions require more power, yet batteries take up more space and add more weight as the storage capacity increases. As a result, power savings must be designed into every aspect of the device. The LCD panels of the typical 2.2 in QVGA display consumes only 12 milliwatts, but the LED backlight draws an additional 216 mw, therefore the current challenge is to reduce the power consumption of the lighting system.

Unfortunately, today's LED backlighting system cannot ease the above-mentioned problem. Almost all the full color mobile phone cannot be read adequately under the sunshine no matter how powerful the battery is. Most currently available cellular phone devices are not suitable for outdoor applications due to the sun shine washout effect. The intensity of the incident sunlight can be many times more than the luminance of the display's built-in back lighting. The intensity of surface reflection of the sunlight is so high, for instance, more than 200 nits, which will substantially washout the displays image. People usually cannot recognize the information on the display. For instances, in the sunshine people can even hardly find the phone number on the screen to dial. On the other hand, the back-lit panel attached behind the display panel is the major aspect of the power consumption in both indoor and outdoor applications. Generally, more than half of the electric energy of a device is consumed by the LED backlighting system, which requires a bulky battery structure to ensure an enough operation time. Obviously, how to realize longer operation time is always the big challenge for a mobile phone design.

In the US patent application with the U.S. Ser. No. 11/788, 096, the applicant has described a sunlight readable direct-view and projection view computer device, herein incorporated by reference.

SUMMARY OF THE INVENTION

It is the primary objective of this invention to create a sunlight readable mobile phone device.

It is another objective of this invention to provide the mobile phone with a super high contrast ratio in outdoor environment.

It is again another objective of this invention to make use of natural light as a lighting source to illuminate the mobile phone display so as to remarkably reduce the power consumption.

It is another objective of this invention to utilize both the natural light and the artificial light to illuminate the mobile phone display.

It is still another objective of this invention to reduce overall thickness and weight of the mobile phone device, which makes it more portable.

DETAILED DESCRIPTION

Figure 1:
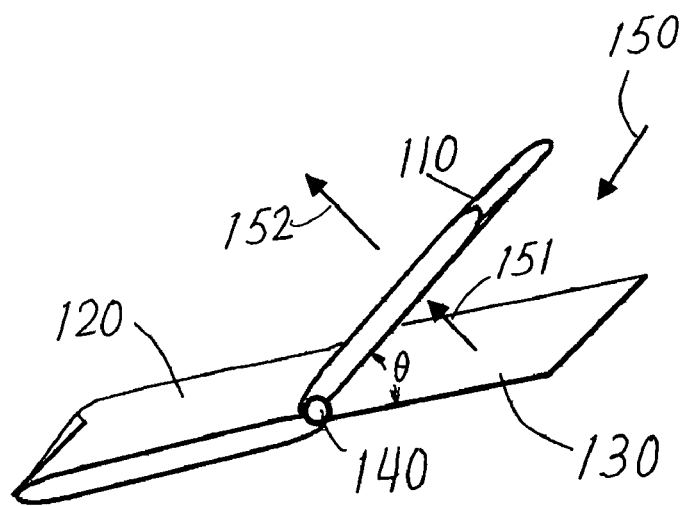
FIG. 1 illustrates schematic drawing of the mobile phone structure illuminated by the built-in backlight and/or the sunlight.

Referring first to FIG. 1, illustrated is a schematic drawing of the mobile phone structure illuminated by the sunlight. The basic structure is the same as the cellular phone structure described in the prior art, except the fact that the outside surface of the phone opens a transparent or translucent window allowing the sunlight 150 to illuminate the display screen from the opposite side of the viewing side. There is a sunlight collecting panel or a reflector panel 130 located behind the display panel 110 with its one terminal mechanically linked by a shift 140, which is fixed on the phone's main body 120. Both the display panel and the reflector panel can be rotated freely around the shift 140. As shown in FIG. 1, the angle between the display panel and the reflector panel should be best suitable for receiving the ambient lighting. Normally the angle is in a range of 0°-120° depending on the applications. When the angle is set to zero the reflector 130 is physically attached on the display panel 110, no ambient light is used for illuminating the display unit. This is actually the prior art backlight structure where the built-in LED backlight is the lighting source. But when the open angle between the reflector panel and the display panel is over 40 degrees, the built-in LED backlight will be automatically turned off and the sunlight or ambient light 151 will, in turn, illuminate the display panel 110. Finally a viewer will senses the imaging light 152 out of the display screen. A sensor is located at the bottom corner of the display window. The sensor may be a mechanical sensor or a photo sensor. The function of the sensor is that at the zero degree angle between the reflector and display panel, the switch will be pressed to set the built-in backlight in ON state; while at a large angle, the sensor sets the switch to the backlight OFF state. A plastic cover plate in the front of the display panel is used to cut off the UV and infra-red component as well as to rugged the display panel. The plastic plate should be substantially transparent to the visible light with the transmission in the range of 90~96%. A LED backlight component including the light guide plate and related functional films (not shown in FIG. 1) may remain the same as the prior art structure since they are basically transparent or translucent to the external light.

Environment light 151 represents either indirect sunlight or direct sunlight. As a matter of fact, the intensity or luminance of the sunlight may be many times stronger than a normal LED back lighting of the display unit. The luminance of the display will be monitored and controlled simultaneously by the sensor and related circuit. In the out-door operation, the built-in backlight is automatically switched off. While in the indoor operation, either the built-in back light or the environment lighting may illuminate the display optionally. With the help of the environment light, the back lighting may dim down automatically to a certain level or may be switched off completely, which results in prolonged operation time of the cell phone based on the given storage capacity of the battery or the reduction of the weight of the battery based on the given operation time.

Traditional solution of a sunlight readable cell phone is to combine many LED lamps parallel to boost the display brightness. Because of the added lamps, the high brightness LCD creates some undesirable problems, which include high power consumption, excessive heat generation, increased dimensions, electrical circuit alterations, and shortened LCD lifetime. Yet the brightness is still not high enough to be directly viewed under the sun shine, it has to be viewed under a shadow. Nevertheless, the volume of the battery and heat sink structure make the mobile too heavy to carry. In the present invention, however, the state of the art adopts an opposite approach to use the sun light instead of competing with it. It takes the full advantage of the solar energy to offset or eliminate the built-in back lighting system so as to turn out a slim and a conservation solution to the mobile device. Thus without the burden of the lighting system, the volume of the battery can be remarkably reduced.

EXPERIMENT 1

To carry out the experiment, a Samsung T-mobile phone with a color STN display and a LED backlight was tested in both indoor and outdoor conditions. The test result are listed as follows where Y represents the luminance in the unit of $Cd/m^2$ or nit and x, y represent the CIE 1931 color coordinates respectively.

| White Color | Y (nit) | x | y |
| --- | --- | --- | --- |
| Outdoor Sunlight | 560 | .300 | .325 |
| Indoor Ambient | 290 | .263 | .290 |
| Dark Room | 240 | .251 | .279 |

One may recognize that under the sunlight the display's surface reflection is 320 nits which are much larger than that of the LCD's brightness illuminated by the backlight. The color coordinate also shows that the sunlight (the D65 standard lighting source x=0.313; y=0.329) is the dominant component when the phone display is presented in the sunlight environment. The contrast ratio of the cell phone display under the sunshine is less than 1.75, which means that the display image is seriously washed out. Note, the outdoor brightness data was collected in such a way that the display's viewer side is facing opposite the sunlight direction. If the view side were towards the direct sunlight, the contrast would have been even worse.

A similar color STN display without backlight component was tested in the outdoor environment. Two types of reflectors have been used: one is a specula mirror panel, the other one is a diffusive Aluminum foil. The angle of the mirror plate relative to the display panel is set to collect the sky light (indirect sunlight), instead of directly reflecting the sunlight. On the other hand, the diffusive reflector film was allowed to collect partially the direct sunlight so that the illumination is not too intense. And the test result is listed as following.

|  | Y (nit) | x | y |
| --- | --- | --- | --- |
| Mirror plate | 864 | .268 | .343 |
| Diffusive Al | 3,670 | .290 | .357 |
| Dark State | 316 | .225 | .261 |

The contrast ratio was measured 2.7 and 11.6 with the mirror and the diffusive Aluminum respectively. Please note that the mirror plate was tuned to a position at which only the indirect sunlight (sky color) can be collected. If the reflector directly reflects the sunlight, the display will be too bright to be directly seen even though the contrast ratio can be much higher. As a result, the cell phone structure illustrated in FIG. 1 shows much higher brightness and contrast ratio than that of the prior art cell phone display.

EXPERIMENT 2

A TFT cell phone display was opening a window to transmit the ambient light. The original light-guide plate and the diffusive layer of the back light system had been taken out. The device was then put into both the indoor and outdoor environments. The luminance was measured with the unit of $Cd/m^2$ or nit. Thus, the brightness of the full color TFT display is totally reliant on the ambient light.

1. Indoor with Mirror Reflector

The test was carried out inside the room toward a south window. A mirror reflector was located in a suitable angle to effectively collect the ambient light.

|  | Y | x | y |
|---|---|---|---|
| White | 280 | .287 | .370 |
| Black | 5.47 | .280 | .330 |
| Red | 48 | .551 | .347 |
| Green | 187 | .286 | .550 |
| Blue | 58 | .144 | .191 |

It is easy to figure out that the contrast ratio is 51:1 and the color saturation is around the 40% of NTSC standard.

2. Outdoor with Mirror or Diffusive Reflector

The test was carried out in the outdoor sunny and cloudy environments. A mirror reflector was located in a suitable angle to effectively collect the sky light. A diffusive reflector was located in a suitable angle to collect partially direct sunlight.

|  | Y | x | y |
|---|---|---|---|
| White (sunny, mirror) | 1,440 | .298 | .365 |
| White (sunny, diffusive) | 4,380 | .326 | .386 |
| White (cloudy, mirror) | 809 | .291 | .363 |
| White (cloudy, diffusive) | 765 | .312 | .375 |
| Black (sunny) | 274 | .309 | .346 |
| Black (cloudy) | 150 | .311 | .353 |
| Red (sunny) | 1,520 | .520 | .346 |
| Green (sunny) | 3,220 | .306 | .491 |
| Blue (sunny) | 1,560 | .217 | .269 |
| Contrast ratio (cloudy) | 8:1 | | |
| Contrast ratio (sunny) | 15 | | |

It was noticed that the contrast ratio in an outdoor as indicated in FIG. 1 is lower than that of the indoor application due to the surface reflection. But it is till qualified as an outstanding outdoor display device considering the facts that there is no electric power consumption for lightening the display and that the contrast is still the same as a black-and-white laser printed paper. It is well known in the art that by means of laminating an anti-reflective or AR coating layer to the viewer side of the display, the surface reflection will be remarkably offset so that the contrast ratio will be further increased.

Figure 2:
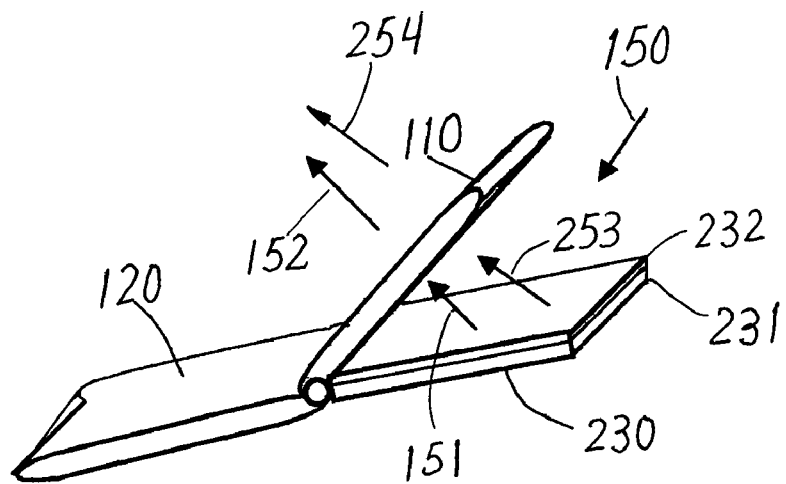
FIG. 2 illustrates schematic drawing of the mobile phone structure illuminated by both and ambient light and the LED light.

Turning now to FIG. 2, illustrated is a new mobile phone structure with two lighting sources, an ambient light and an artificial light. The lighting plate 230 is composed of two components: the first is the ambient light reflector 231 and the second is the LED lighting unit 232. The LED lighting chip embedded in the lighting plate 230 serves as a lighting source when the environment light is not bright enough. The difference between such LED design and the prior art design is that the LED lighting in the state of the art is an out-source-lighting which cooperates with the environment lighting ensuring the display with an adequate illumination. There are two light components out of the lighting plate, ambient light 151 and artificial light 253. Both will pass through the display panel and being modulated by the liquid crystal material under the electrical field with their optical states determined by polarizers, color filter array and driving signals. Finally, they emerge to the front side of the display as the light 152 and 254 respectively.

As far as the LED lighting design, it can be a lighting block or a lighting panel. The lighting block 232 may locate on the edge of the reflecting plate as indicated in FIG. 2. The lighting panel may be embedded behind the reflective layer 231 due to the fact that the reflective layer can be a reflective polarizer film or a transflective optical film. In both the LED arrangements, a suitable LED lighting angle is necessary to make the lighting as uniform as possible across the display panel. The lighting panel may also be a transparent organic LED or OLED film laminated onto the reflector. When the environment lighting is bright enough, the OLED film is in OFF state and works as a window allowing the environment light passing through; when the environment lighting is not bright enough, the OLED film will be switched ON partially or completely and makes a uniform lighting across the display panel.

The design takes full advantage of the surrounding light condition via combining both the ambient light and the LED or OLED light to conserve the electric power even in the literally dark environment.

Figure 3:
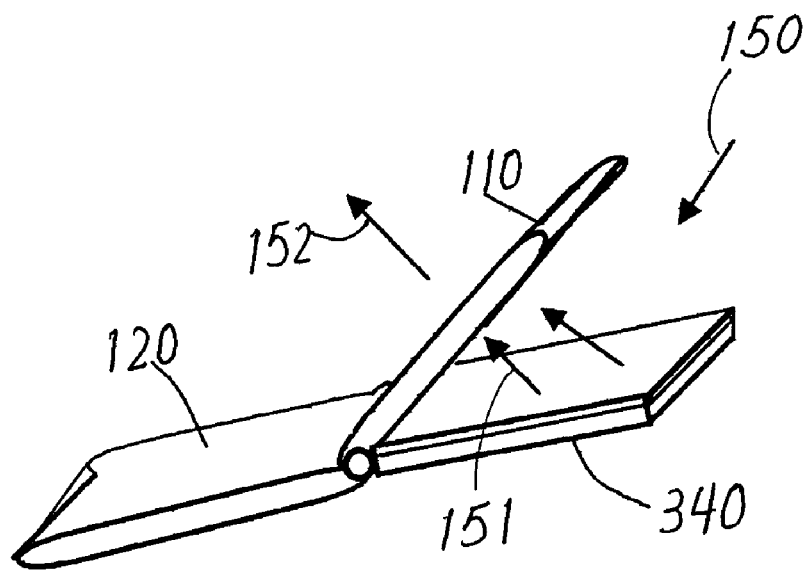
FIG. 3 illustrates a schematic drawing of the mobile phone structure illuminated by the sunlight and powered by the solar cell.

Turning now to FIG. 3, illustrated is a schematic drawing of a mobile phone structure with a double-side-collection solar power unit. A double side solar panel 340 is laminated with a reflective polarizer film or a semi-reflective film 130. When the phone is in audiovisual working condition, the reflective polarizer or semi-reflective film is located on the top of the solar cell panel. A portion of the sunlight will generate electric power via the solar cell panel and other portion of the sunlight will reflect back through the display panel as the light 152. Normally, 20~50% incoming sunlight can be arranged to illuminate the display and other 50~80% light will have a chance to be converted to electric power for the cell phone via constantly charging the battery.

When the mobile phone is in an idle condition, the solar cell panel along with the display panel 110 will rotate to a position that superimpose with the key board of the phone structure. Thus, the backside of the solar panel will face to the ambient light. All the incoming light will then be converted to the electric power with the conversion efficiency of around 5-10%.

Solar panel 340 will work in both sides. It converts the sunlight into direct current electricity, and then supplies power to a rechargeable battery, which in turn, provides power to operate the appliance load. The cells are laminated in EVA resin with polycarbonate surface and epoxy sealed with silicon rubber into a ultra-violet inhibited polycarbonate plastic housing, thus the solar panels have been designed to withstand the rigors of weather. Tinned TAB ribbon with size of 0.2 mm×2.03 mm and chemical formulation: 62% Sn/36% Pb/2% Ag tinned UNS C11000 Copper. The ribbon is highly reflective. The bus ribbon with size of 0.2 mm×6.35 mm and the same chemical formulation as the TAB is hot dipped UNS C11000 Copper, which is also highly reflective material for reflecting the sunlight.

One design is to use a reflective polarized film as the sunlight collector and the solar panel located underneath the polarizer to convert the remaining solar energy into the electric power. The reflected polarized light passes through the display with the same polarity as the polarizer film attached on the display panel. Therefore, the display has a high efficiency of the energy conversion.

Another design is to separate the solar panel with the reflector. A folded structure can be applied to the unit. The solar panel may be as the front portion and the reflector as back portion. When it opens toward the sunlight both the solar panel and reflector unfold into a flat or curved panel. When it closes both the solar panel and mirror reflector will fold up and put back into the compartment behind of the display panel.

Another design is to directly use the solar panel as the reflector for collecting the sunlight for the display. It is discovered that the surface reflection of the solar panel under the direct sunlight is bright enough to illuminate the color TFT display. As a result, one portion of the sunlight reflected from the solar panel will illuminate the display, while the other portion of the sunlight will be converted to electric power for the device. The dual functions of the solar panel make the invention more applicable.

Top mount and side mount of the solar panel can be also considered for the mobile phone design where the solar panel and the sun light collector are totally separated.

Figure 4:
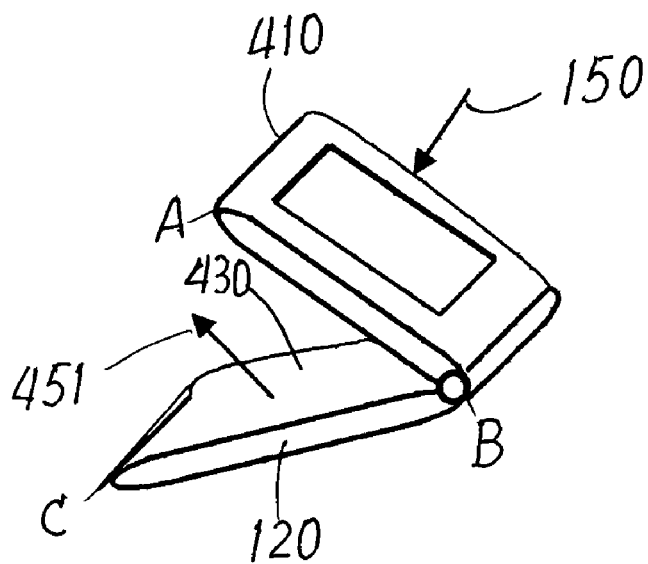
FIG. 4 illustrates another schematic drawing of the mobile phone structure illuminated by the environment light.

Turning now to FIG. 4, illustrated is a mobile phone working in a projection mode. The display panel 410 turns to a half-opened position when the main body of the phone 120 is flipped 180 degrees around the axis. A plane mirror 430 is positioned substantially in parallel with the cell phone's main body opposite the keypad. The angle between the display panel 410 and the mirror plate 430 is normally in the range of 40~50 degrees and more specifically, 45 degrees. As an observer looks into the display at a suitable viewing angle, he or she will sense a clear mirror picture 451. The phone user will be able to cover two edges when handholding the device, which creates a dark room effect, leaving only the front side to be seen. Without the ambient light interference, the picture is in such a high quality that it looks as if it were a movie image in a cinema. The contrast ratio of the display mode almost matches the data when the display is tested in dark room environment. The superior contrast allows the display with relatively low brightness while maintaining its excellent readability. Thus, the display working in the projection mode not only can alleviate human eye fatigue effect but also can remarkably reduce the power consumption of the mobile phone. This important performance is especially applicable to the TV mobile phone where the superior color quality with at least 72% NTSC standard and a TFT display with its resolution of at least QVGA (240×320) are required. Meanwhile, the power consumption of the TFT mobile phone display has reduced from 228 mw to 12 mw compared with a similar mobile phone with 3 white LED diodes, each of them has a forward current 22.5 mA, at the working voltage 3.2 V and the power consumption for each one is 72 mw.

In a sunlight condition, the cell phone screen is able to tilt down to a lower open angle to avoid the image directly exposed to the sunlight so that the washout effect will be substantially reduced. As shown in FIG. 4, the triangle area, ΔABC, confined by the A, B and C point in both edges of the cell phone can be covered by hand palm to create a mini dark environment. As a result, the display image or the phone information will be sharp enough for the human eyes in the out-door applications.

EXPERIMENT 3

In an indoor windowless office condition, where the lighting source is a set of hot cathode florescent tubes, an optical testing of a TFT cell phone without built-in backlight was carried out. The display was preset in the projection mode as shown in FIG. 4. As references, a monochrome black-and-white STN cell phone, TFT cell phone with normal LED backlight and a laser printed paper were also tested respectively. The results are listed as following:

|  |  | Y (nit) | x | y | CR |
|---|---|---|---|---|---|
| TFT(sit) | White | 69 | .374 | .455 |  |
|  | Black | 2.1 | .367 | .435 | 32.8 |
| TFT(stand) | White | 142 | .385 | .455 |  |
|  | Black | 3.6 | .386 | .451 | 67.8 |
| B/W STN | White | 83 | .385 | .454 |  |
|  | Black | 3.3 | .355 | .390 | 25.1 |
| Backlit TFT | White | 99 | .330 | .365 |  |
|  | Black | 3.6 | .342 | .379 | 27.5 |
| Paper | White | 165 | .380 | .422 |  |
|  | Black | 25.2 | .396 | .428 | 6.5 |

It is concluded that the new TFT mobile phone without backlight has higher contrast ratio and brightness in the height of the stand-up position.

Privacy and security are also the important characteristics of the present invention. Only the device user will be able to discern the information displayed on the screen, which may be also used as a military communication tool or personal information center.

The state of the art of the cell phone structures described in FIG. 1 to FIG. 4 is not limited in the liquid crystal display. Other passive lighting flat panel displays such as color e-ink display, dichroic display etc. can also be suitable for the sunlight readable and the sunlight illumination displays.

The state of the art of the cell phone structures described in FIG. 1 to FIG. 4 is not limited in the flat panel displays. Any flexible display with one-dimensional or two-dimensional structures can also be suitable for the sunlight readable and the sunlight illumination displays.

In a word, the state of art disclosed in this invention opens a novel area of technology advancement that enables low-power-consumption and higher-performance display devices for battery-powered indoor and outdoor applications. The sunlight readable and the sunlight illuminated displays introduced in the present invention can be applied to all handheld mobile systems, including cellular handsets, UMPC, PMPs, handheld games, MP3 players, digital still cameras and navigation products.

I claim:

1. A sunlight illuminated and sunlight readable mobile phone device comprising:
   a. a display panel with a built-in backlighting;
   b. a light collecting panel;
   c. a mobile phone body;
   d. a sensor;
   wherein the mobile phone body, the display panel and the light collecting panel aligned in a predetermined angular position and feedback to the light sensor allowing the display panel to enable the built-in backlighting;
   wherein the light collecting panel separates the display panel with other angular positions to enable the sunlight illumination;
   whereby the mobile phone device allows a user to discern the display image at both dark environment and sunlight environment with an extraordinary readability and remarkably less power consumption.

2. The sunlight illuminated and sunlight readable mobile phone as in claim 1 wherein the display panel is a full color transmissive active matrix display.

3. The sunlight illuminated and sunlight readable mobile phone as in claim 1 wherein the display panel is a full color transmissive passive matrix display.

4. The sunlight illuminated and sunlight readable mobile phone as in claim 1 wherein the display panel is a full color transflective display.

5. The sunlight illuminated and sunlight readable mobile phone as in claim 1 wherein the angular position between the display panel and the light collecting panel is in the range of 30~120 degrees, more preferably 45 degrees.

6. The sunlight illuminated and sunlight readable mobile phone as in claim 1 wherein the extraordinary readability means that, under direct sunlight, the contrast ratio is in the range of 2~100; in the indoor environment, the contrast ratio is in the range of 10~600.

7. The sunlight illuminated and sunlight readable mobile phone as in claim 1 is further including a double-side solar cell panel laminated with the light collecting panel.

8. The sunlight illuminated and sunlight readable mobile phone as in claim 1 wherein the light collecting panel is a specula reflector.

9. The sunlight illuminated and sunlight readable mobile phone as in claim 1 wherein the light collecting panel is a diffusive reflector.

10. The sunlight illuminated and sunlight readable mobile phone as in claim 1 wherein the light collecting panel is a reflective polarizer.

11. Sunlight illuminating and sunlight readable mobile phone comprising:
   a. a display panel;
   b. a light collecting panel;
   c. a mobile phone body;
   wherein the display panel is substantially transparent with its two sides to the ambient light allowing the sunlight to illuminate the display from one side of the display;
   wherein the mobile phone body, the display panel and the light collecting panel aligned in a predetermined angular position allowing the display panel to be illuminated by the light from the light collecting panel;
   whereby the mobile phone device allows a user to discern the display image at both dark environment and sunlight environment with an extraordinary readability and remarkably less power consumption.

12. The sunlight illuminating and sunlight readable mobile phone as in claim 11 wherein the light collecting panel is a composite structure of a reflector and a transparent OLED lighting component.

13. The sunlight illuminating and sunlight readable mobile phone as in claim 11 wherein the light collecting panel is a composite structure of a reflector and a LED lighting component.

14. The sunlight illuminating and sunlight readable mobile phone as in claim 11 wherein the light collecting panel is a mirror plate.

15. The sunlight illuminating and sunlight readable mobile phone as in claim 11 wherein the light collecting panel is a diffusive reflective metal plate.

16. The sunlight illuminating and sunlight readable mobile phone as in claim 11 wherein the light collecting panel is a reflective polarizer plate.

17. The sunlight illuminating and sunlight readable mobile phone as in claim 11 wherein the light collecting panel is a cholesteric reflective polarizer plate.

18. The sunlight illuminating and sunlight readable mobile phone as in claim 11 wherein the predetermined angle is in a range of 30~100 degrees, more specifically, 40~50 degrees.

* * * * *